United States Patent
Chang (10) Patent No.: US 7,220,045 B2
(45) Date of Patent: May 22, 2007

(54) BACKLIGHT ASSEMBLY AND LIQUID CRYSTAL DISPLAY DEVICE HAVING THE SAME

(75) Inventor: Se-In Chang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/230,123

(22) Filed: Sep. 19, 2005

(65) Prior Publication Data

US 2006/0109643 A1    May 25, 2006

(30) Foreign Application Priority Data

Nov. 24, 2004   (KR) .................... 10-2004-0097057

(51) Int. Cl.
    *F21V 7/00*   (2006.01)
(52) U.S. Cl. .................... 362/633; 349/58; 362/634
(58) Field of Classification Search ........ 362/632–634, 362/328–329; 349/58, 70
    See application file for complete search history.

(56) References Cited

U.S. PATENT DOCUMENTS 4,572,553 A * 2/1986 Geldner .................. 285/363
6,885,411 B2 * 4/2005 Ogawa et al. .............. 349/58
2002/0044437 A1 * 4/2002 Lee ........................... 362/31
2004/0240195 A1 * 12/2004 Tsai .......................... 362/31
2004/0246401 A1 * 12/2004 Lee et al. .................... 349/58

* cited by examiner

*Primary Examiner*—Renee Luebke
*Assistant Examiner*—Julie A. Shallenberger
(74) *Attorney, Agent, or Firm*—Cantor Colburn LLP (57) ABSTRACT

A backlight assembly includes a receiving container, a reflecting member, a light source, and a diffusion plate. The receiving container includes a bottom plate and a sidewall upwardly protruded from sides of the bottom plate. The sidewall has at least one recess. The reflecting member includes a reflecting part and a fixing part extended from end portions of the reflecting part to be inserted into the at least one recess. The light source is disposed above the reflecting member to generate light. The diffusion plate is disposed above the light source to diffuse the light. As a result, the manufacturing process for fabricating the reflecting member may be simplified and a size of the backlight assembly may be decreased.

40 Claims, 9 Drawing Sheets

BACKLIGHT ASSEMBLY AND LIQUID CRYSTAL DISPLAY DEVICE HAVING THE SAME

The present application claims priority to Korean Patent Application No. 2004-97057 filed on Nov. 24, 2004 and all the benefits accruing therefrom under 35 U.S.C. §119, the contents of which are hereby incorporated herein by reference in its entirety.

BACKGROUND OF THE INVENTION

1. Field of the Invention

The present invention relates to a backlight assembly and a liquid crystal display (LCD) device having the backlight assembly. More particularly, the present invention relates to a backlight assembly to allow simplification of the manufacturing process and a decrease in the size of the backlight assembly and an LCD device having the backlight assembly.

2. Description of the Related Art

An LCD device displays images using optical characteristics (i.e. anisotropy of refractivity) and electrical characteristics (i.e. anisotropy of dielectric constant) of liquid crystal. The LCD device has advantageous characteristics such as thinner thickness, lower driving voltage, lower power consumption, etc., than other types of display devices such as a cathode ray tube (CRT) device, a plasma display panel (PDP) device, etc.

The LCD device is non-emissive type display device, which requires a light source to supply light to an LCD panel of the LCD device.

The backlight assembly is classified either as an edge illumination type or a direct illumination type based on the location of the light source. In other words, in the edge illumination type, the backlight assembly includes a light guiding plate and one or two light sources adjacent to a side surface of the light guiding plate so that the light generated from the light sources is guided into the LCD panel of the LCD device. In the direct illumination type, the backlight assembly includes a plurality of light sources under the LCD panel and a diffusion plate disposed between the LCD panel and the light sources so that the light generated from the light sources is diffused and irradiated into the LCD panel. In general, a small screen LCD device has the edge illumination type backlight assembly with thin thickness and a large screen LCD device has the direct illumination type backlight assembly with high luminance.

When the LCD device has the direct illumination type backlight assembly, a reflecting plate is attached to a receiving container using a double-sided tape Manufacturing process becomes, therefore, complicated and the reflecting plate has an irregular surface. In addition, a size of the receiving container is increased.

SUMMARY OF THE INVENTION

The present invention provides a backlight assembly to allow a simplification of manufacturing process and a decrease in its size. The present invention also provides an LCD device having the above-mentioned backlight assembly.

A backlight assembly in accordance with an exemplary embodiment of the present invention includes a receiving container, a reflecting member, a light source, and a diffusion plate. The receiving container includes a bottom plate and a sidewall protruding from end portions of the bottom plate and having a recess. The reflecting member includes a reflecting part and a fixing part extending from a side of the reflecting part to be inserted into the recess. The light source is disposed above the reflecting member to generate a light. The diffusion plate is on the light source to diffuse the light.

A liquid crystal display device in accordance with an exemplary embodiment of the present invention includes a backlight assembly and a liquid crystal display panel. The backlight assembly includes a receiving container, a reflecting member and a light source. The receiving container has a bottom plate and a sidewall protruding from sides of the bottom plate. The sidewall has a recess. The reflecting member includes a reflecting part and a fixing part extending from a side of the reflecting part to be inserted into the recess. The light source is disposed above the reflecting member to generate a light. The liquid crystal display panel displays an image based on the light from the backlight assembly.

Therefore, the manufacturing process for fabricating the reflecting member is simplified, and the size of the backlight assembly is decreased.

BRIEF DESCRIPTION OF THE DRAWINGS

The above and other advantages of the present invention will become more apparent by describing in detail exemplary embodiments thereof with reference to the accompanying drawings, in which.

DETAILED DESCRIPTION OF THE INVENTION

It should be understood that the exemplary embodiments of the present invention described below may be modified in many different ways without departing from the inventive principles disclosed herein, and the scope of the present invention is therefore not limited to these particular embodiments. Rather, these embodiments are provided so that this disclosure will be through and complete, and will fully convey the concept of the invention to those skilled in the art by way of example and not of limitation.

Hereinafter, the present invention will be described in detail with reference to the accompanying drawings.

Figure 1:
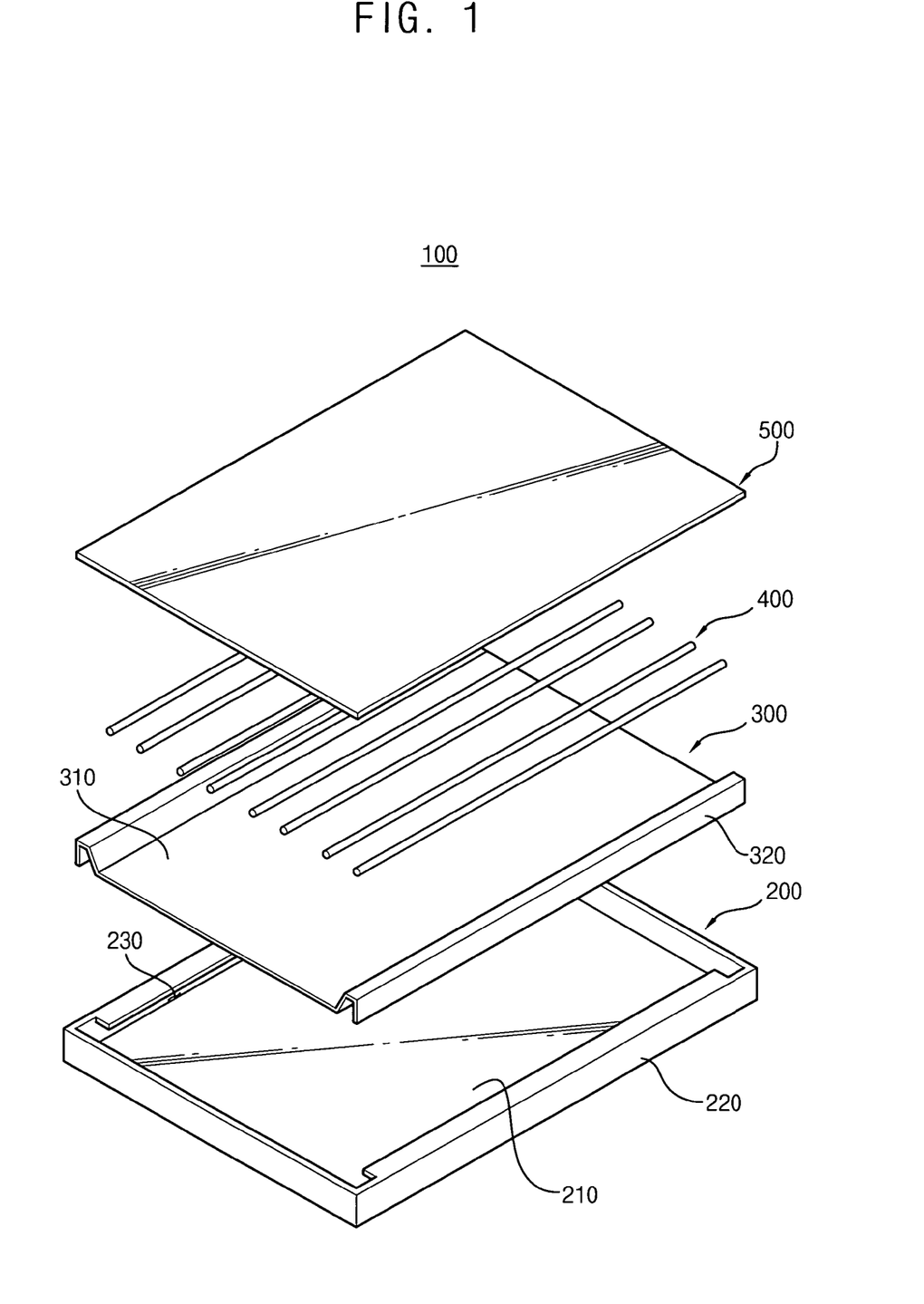
FIG. 1 is an exploded perspective view showing a backlight assembly in accordance with an exemplary embodiment.
Figure 2:
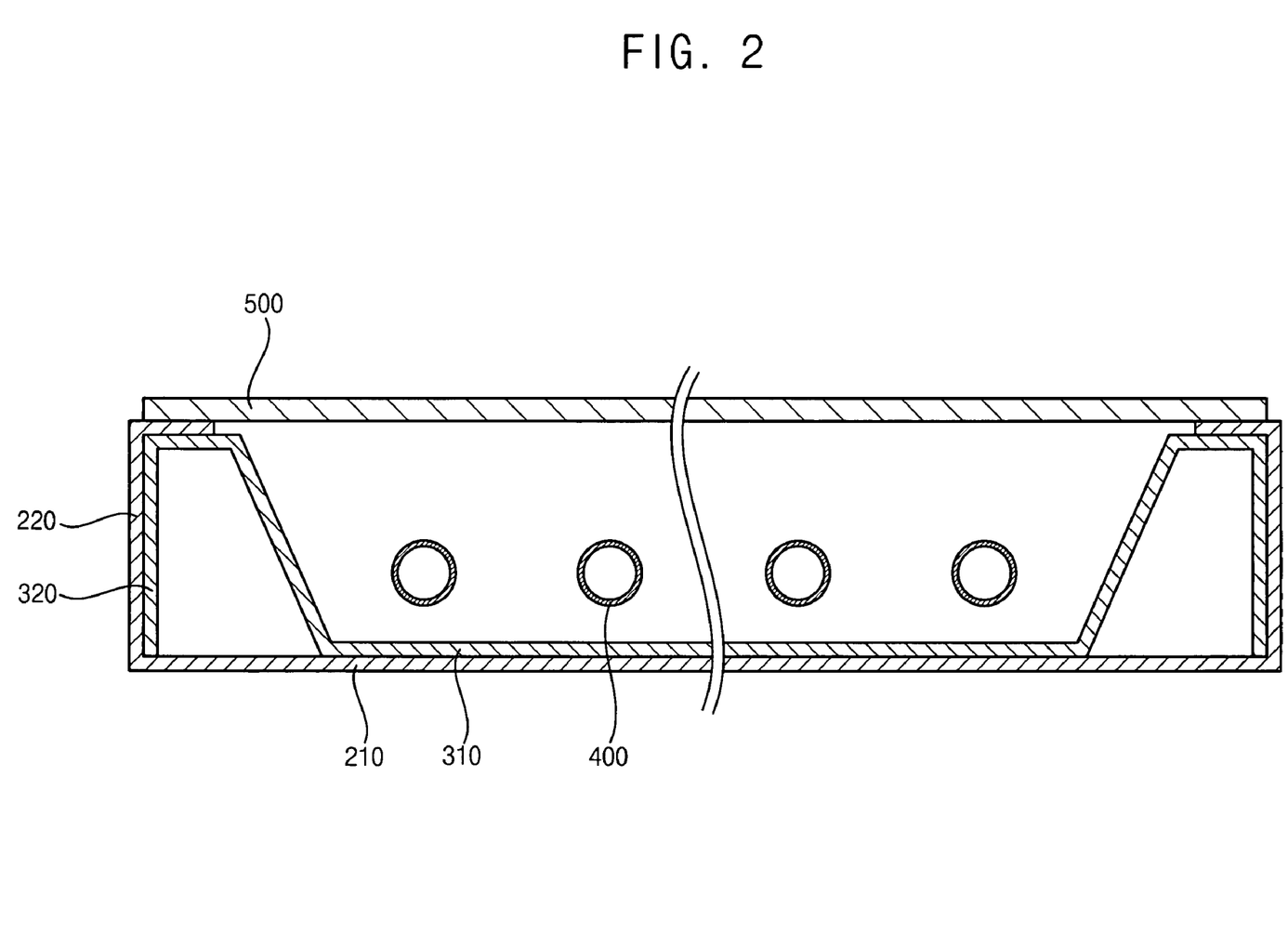
FIG. 2 is a side cross-sectional view showing the backlight assembly shown in FIG. 1.

FIG. 1 is an exploded perspective view showing a backlight assembly in accordance with an exemplary embodiment. FIG. 2 is a side cross-sectional view showing the backlight assembly shown in FIG. 1.

Referring to FIGS. 1 and 2, the backlight assembly 100 includes a receiving container 200, a reflecting member 300, a light source 400, and a diffusion plate 500.

The receiving container 200 includes a bottom plate 210 and a plurality of sidewalls 220 that are upwardly protruded from end portions of the bottom plate 210 to form a receiving space. An end portion of the sidewalls 220 is inwardly bent to form a recess 230. In this exemplary embodiment, the receiving container 200 is made of, such as, but not limited to, strong metal intolerant to deformation.

The reflecting member 300 is positioned under and beside the light source 400 so that light generated from the light source 400 may be reflected from the reflecting member 300 toward the diffusion plate 500. In this exemplary embodiment, the reflecting member 300 is made from, for example, polyethylene terephthalate (PET) of white color. The reflecting member 300 includes a reflecting part 310 and a fixing part 320. The reflecting part 310 makes contact with the bottom plate 210. The fixing part 320 upwardly extends from end portions of the reflecting part 310 and inserted into and snapped within the recess 230 of the receiving container 200. In this exemplary embodiment, the fixing part 320 has, such as, but not limited to, a trapezoidal shape to be securely combined with the recess 230. The reflecting member 300 includes, for example, two opposing fixing parts 320 and may be made from, such as, but not limited to, a synthetic resin with a selected thickness. The reflecting member 300 has elastic property to allow recovery of an original shape of the fixing parts 320 even after being combined with the recess 230. When the fixing part 320 is inserted into and snapped within the recess 230, the reflecting member 300 is securely combined with the receiving container 200 due to the elasticity of the reflecting member 300.

The light source 400 is positioned over the reflecting member 300 and generates light in response to an electric power provided by the inverter (not shown). In this exemplary embodiment, the light source 400 includes a plurality of lamps (only eight lamps shown in FIG. 1). All the lamps of the light source 400 may be, for example, a cold cathode fluorescent lamp (CCFL) with a tubular shape, light emitting diodes (LEDs), etc. and spaced apart from one another by a selected distance. It should be understood that the number of the lamps of the light source 400 may be increased or decreased according to demand for a higher luminance of the backlight assembly 100 and all lamps of the light source 400 may also have a U-shape.

The diffusion plate 500 is positioned over the light source 400 to diffuse the light generated from the light source 400 and thus may enhance luminance uniformity of the light. In this exemplary embodiment, the diffusion plate 500 may have, such as, but not limited to, a quadrangular plate shape with a selected thickness and may be made from polyethylene methacrylate (PMMA) and a diffusing agent. The diffusion plate 500 is spaced above the light source 400 by a selected distance. End portions of the diffusion plate 500, which are substantially parallel with a longitudinal direction of the light source 400, are supported by the sidewalls 220 of the receiving container 200.

Figure 3:
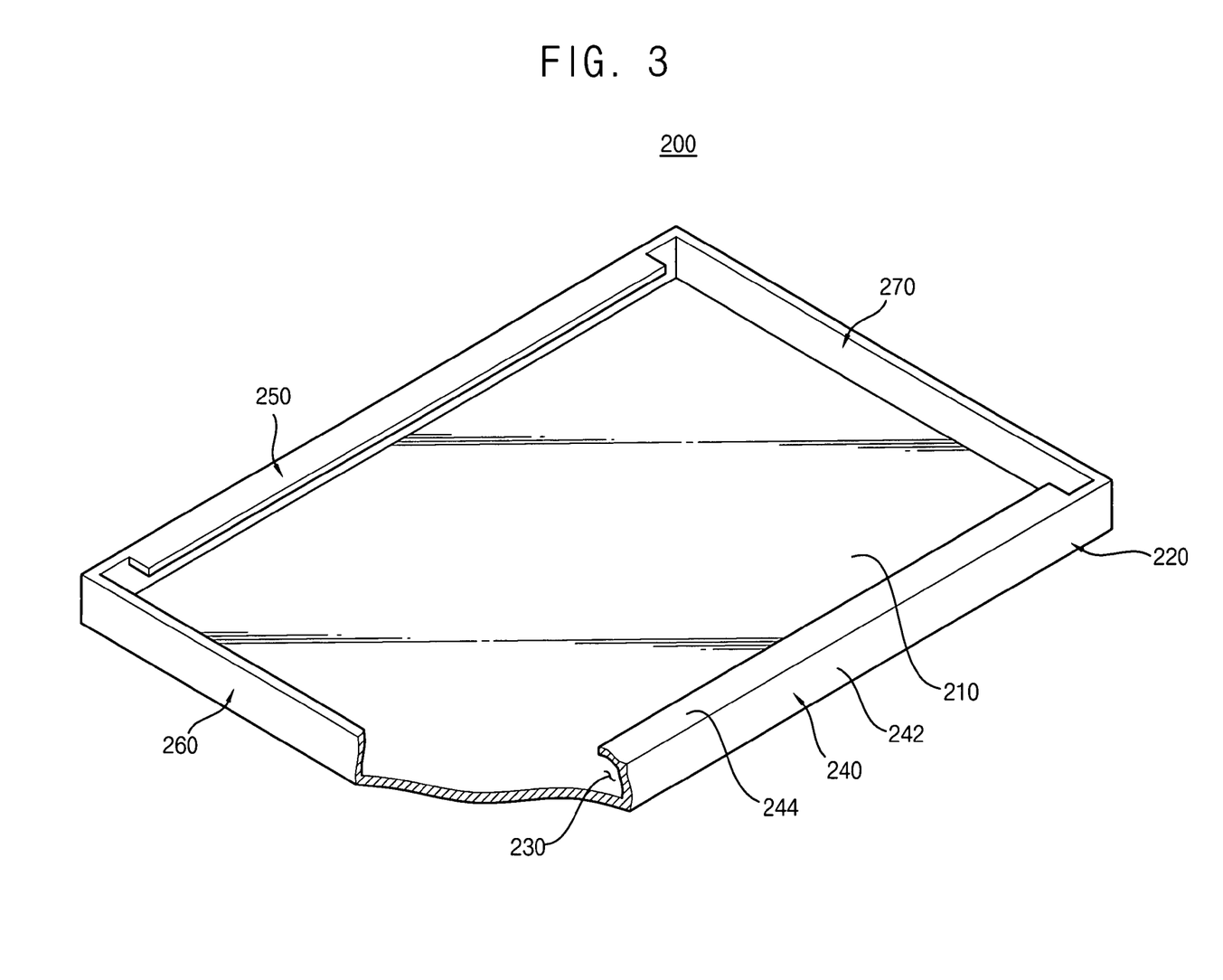
FIG. 3 is a partially cutout perspective view showing a receiving container shown in FIG. 1.

FIG. 3 is a partially cutout perspective view showing a receiving container 200 shown in FIG. 1.

Referring to FIG. 3, the receiving container 200 includes the bottom plate 210 and the sidewalls 220 that upwardly protrude from end portions of the bottom plate 210.

The sidewalls 220 include a first sidewall part 240, a second sidewall part 250, a third sidewall part 260, and a fourth sidewall part 270. The first and second sidewall parts 240 and 250 are substantially parallel with the longitudinal direction of the lamps of the light source 400. The third and fourth sidewall parts 260 and 270 are substantially perpendicular to the longitudinal direction of the lamps of the light source 400. The first sidewall part 240 faces the second sidewall part 250 and the third sidewall part 260 faces the fourth sidewall part 270. The first, second, third, and fourth sidewall part 240, 250, 260, and 270 make contact with one another.

The first sidewall part 240 includes a side portion 242 and a support portion 244. The side portion 242 upwardly extends from an end portion of the bottom plate 210 and is positioned in direction substantially perpendicular to the bottom plate 210. The support portion 244 inwardly extends from an end portion of the side portion 242 and is positioned in direction substantially parallel with the bottom plate 210. The bottom plate 210, the side portion 242, and the support portion 244 form the recess 230 to securely hold the fixing part 320 of the reflecting member 300 in the receiving container 200 (referring to FIG. 1). The support portion 244 may have, such as, but not limited to, a selected size so that the fixing part 320 (referring to FIG. 1) may be snapped within the receiving container 200. In this exemplary embodiment, while the support portion 244 is illustrated as not making contact with the third and fourth sidewall parts 260 and 270, it should be understood that alternate embodiments of the support portion 244 would be within the scope of these embodiments, including, but not limited to, the support portion 244 to make contact with the third and/or fourth sidewall parts 260 and 270. In this exemplary embodiment, the support portion 244 is, for example, but not limited to, about 5 mm wide.

The second sidewall part 250 is substantially the same as the first sidewall part 240 and thus any further explanation will be omitted to avoid duplication.

Figure 4:
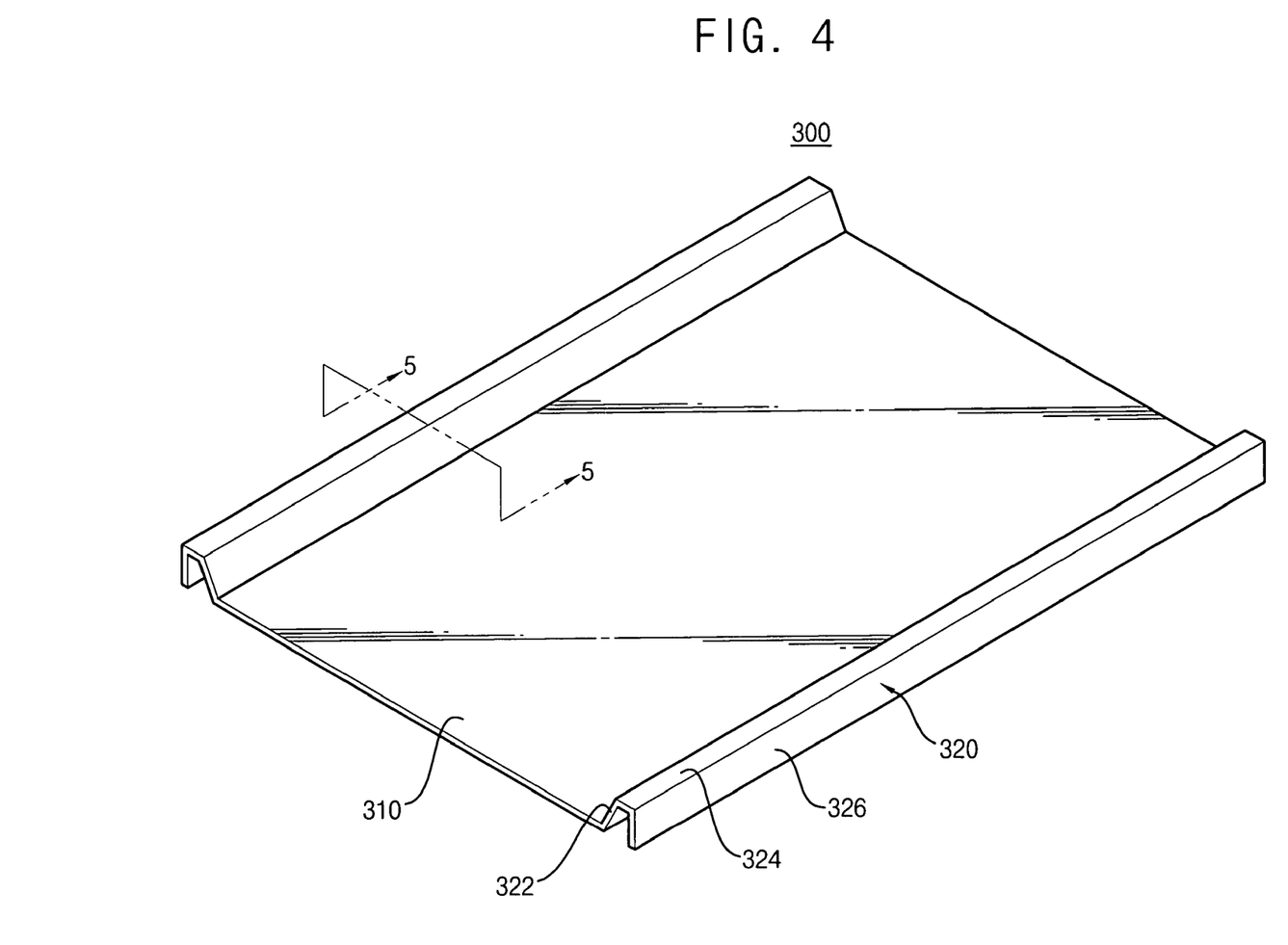
FIG. 4 is a perspective view showing a reflecting member shown in FIG. 1.
Figure 5:
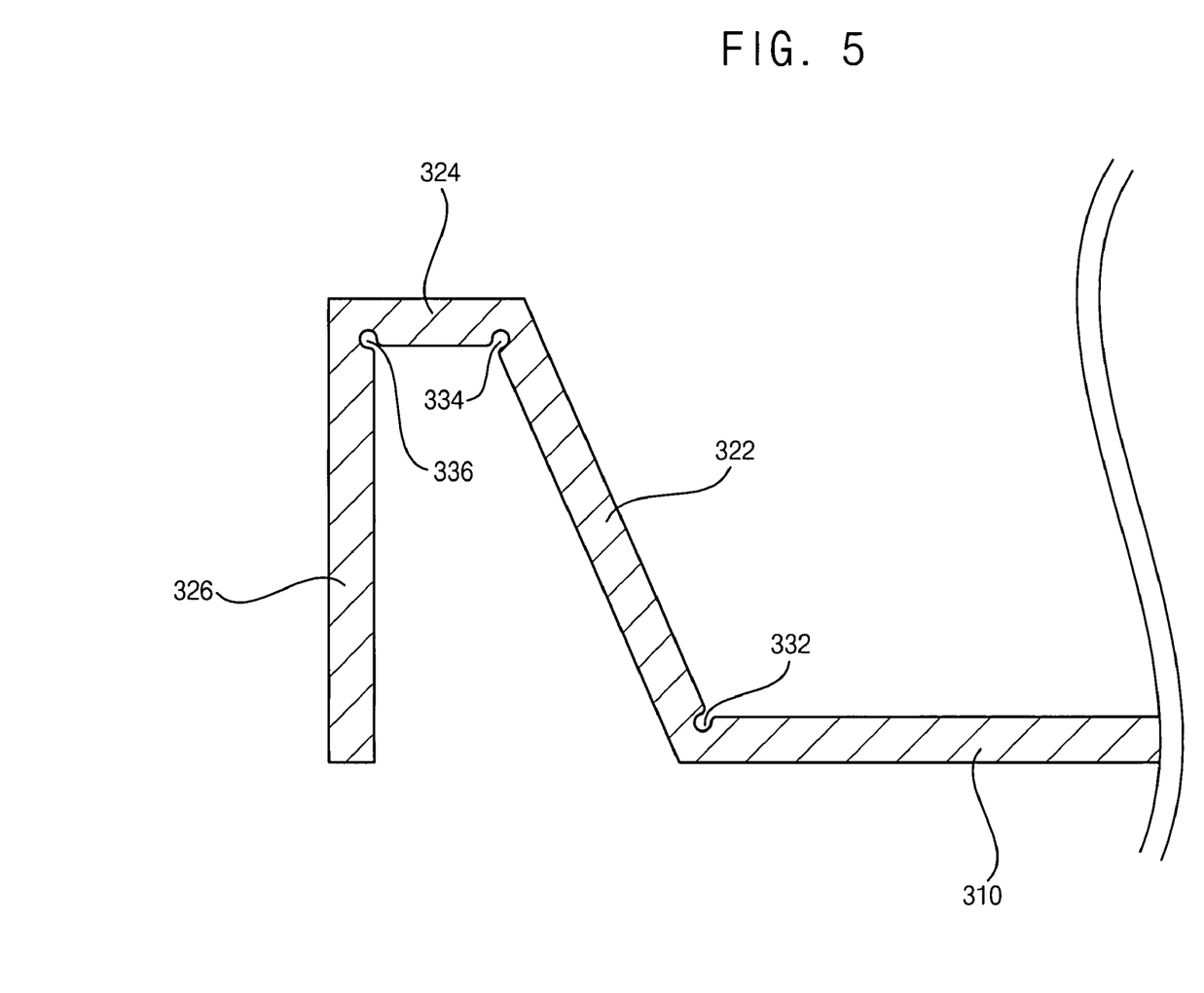
FIG. 5 is a side cross-sectional view taken along line 5–5 of FIG. 4.

FIG. 4 is a perspective view showing the reflecting member 300 shown in FIG. 1. FIG. 5 is a side cross-sectional view taken along line 5–5 of FIG. 4.

Referring to FIGS. 4 and 5, the reflecting member 300 includes the reflecting part 310 and the fixing part 320. The reflecting part 310 makes contact with the bottom plate 210 (referring to FIG. 3). The fixing part 320 upwardly extends from end portions of the reflecting part 310 and inserted into and snapped within the recess 230 (referring to FIG. 3). In this exemplary embodiment, the reflecting member 300 includes two opposing fixing parts 320, but not limited thereto.

The fixing part 320 includes a first fixing portion 322, a second fixing portion 324, and a third fixing portion 326. The first fixing portion 322 upwardly extends from an end portion of the reflecting part 310. The second fixing portion 324 extends from an end portion of the first fixing portion 322 and makes contact with the support portion 244 (referring to FIG. 3). The third fixing portion 326 downwardly extends from an end portion of the second fixing portion 324 and makes contact with the side portion 242 (referring to FIG. 3). The first fixing portion 322 is inclined with respect to a vertical direction of the reflecting part 310 so that the first fixing portion 322 forms an obtuse angle with respect to the reflecting part 310.

Referring to FIG. 5, the reflecting member 300 shown in FIG. 4 includes a first groove 332, a second groove 334, and a third groove 336 so that each of the first, second, and third fixing portions 322, 324, and 326 may have elastic property. The first groove 332 is formed at a contact point between the reflecting part 310 and the first fixing portion 322. The second groove 334 is formed at a contact point between the first and second fixing portions 322 and 324. The third groove 336 is formed at a contact point between the second and third fixing portions 324 and 326. In this exemplary embodiment, the first, second, and third grooves 332, 334, and 336 may be rounded, but not limited thereto.

Figure 6:
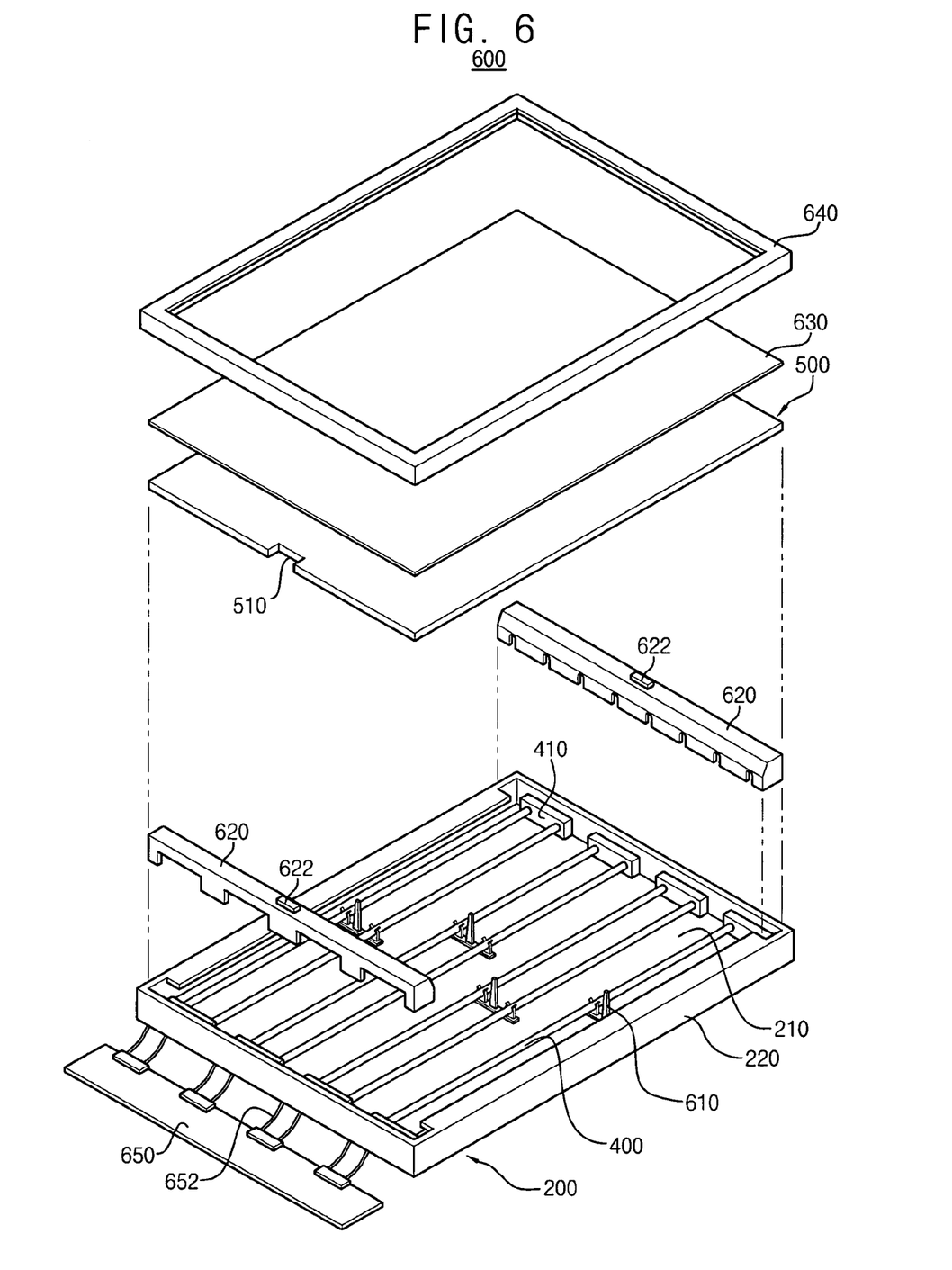
FIG. 6 is an exploded perspective view showing a backlight assembly in accordance with another exemplary embodiment.
Figure 7:
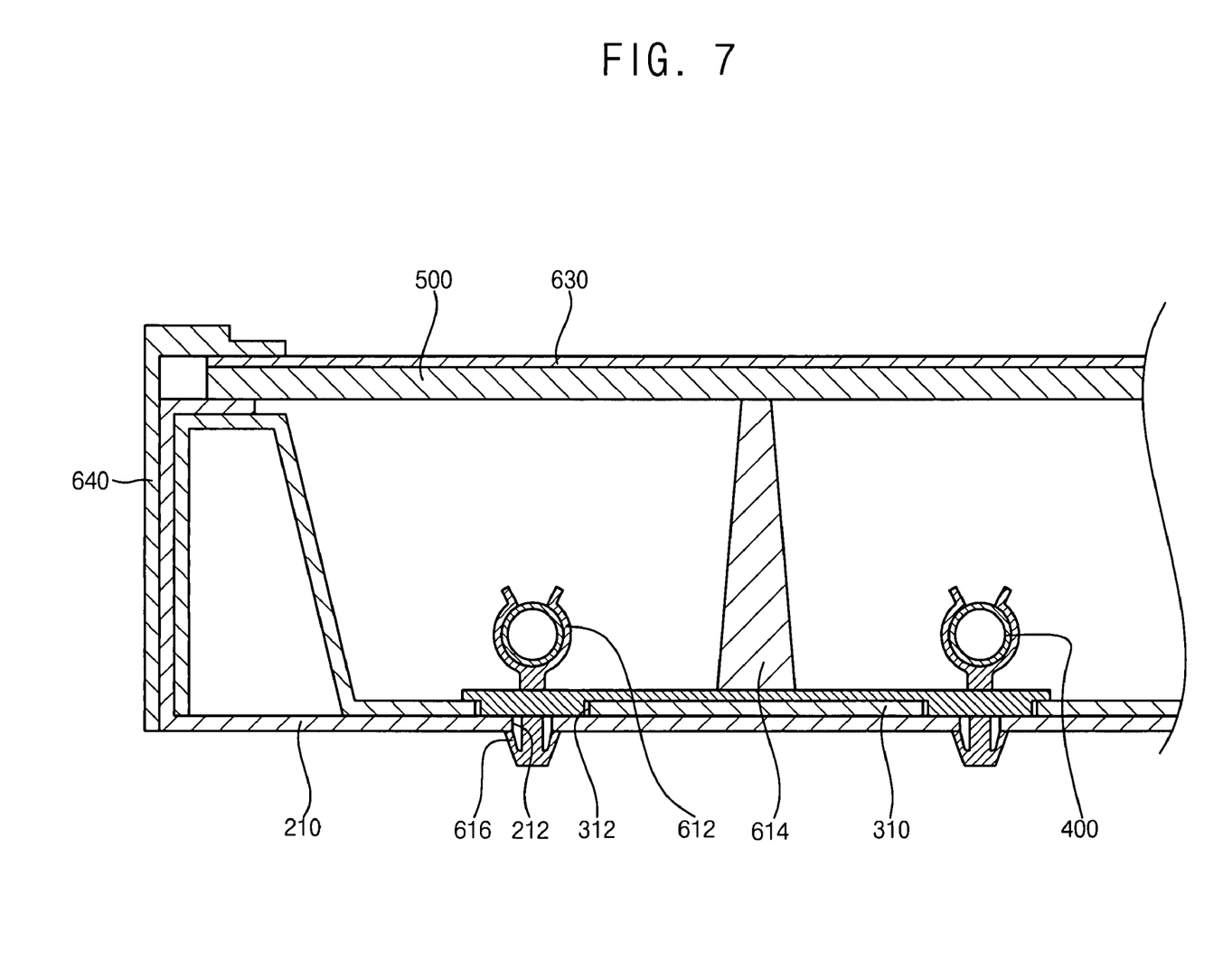
FIG. 7 is a side cross-sectional view showing the backlight assembly shown in FIG. 6.

FIG. 6 is an exploded perspective view showing a backlight assembly 600 in accordance with another exemplary embodiment. FIG. 7 is a side cross-sectional view showing the backlight assembly 600 shown in FIG. 6. The receiving container 600 of FIGS. 6 and 7 is substantially the same as the receiving container 100 in FIG. 1 except further includes a securing hole 212 and the reflecting member 300 is substantially the same as the reflecting member 300 in FIG. 1 except further includes a through-hole 312. Thus, the same reference numerals will be used to refer to the same or like parts as those described in FIG. 1 and any repetitive explanation concerning the above elements will be omitted. Referring to FIGS. 6 and 7, the backlight assembly 600 includes a receiving container 200, a reflecting member 300, a light source 400 having a plurality of lamps, and a diffusion plate 500. The backlight assembly 600 further includes at least one lamp supporter 610 (only four shown in FIG. 6) and at least one side mold 620 (only two shown in FIG. 6). The lamp supporter 610 supports the lamps of the light source 400 and securely holds the lamps of the light source 400. The side mold 620 is positioned on end portions of the lamps of the light source 400.

The securing hole 212 is formed on the bottom plate 210 of the receiving container 200 to fix the lamp supporter 610. In this exemplary embodiment, the securing hole 212 has, for example, but not limited to, a circular shape and corresponds to a securing portion 616 of the lamp supporter 610. The through-hole 312 is formed on the reflecting part 310 of the reflecting member 300 so that the lamp supporter 610 may be combined with the receiving container 200. In this exemplary embodiment, the through-hole 312 may have larger size than that of the securing hole 212. Additionally, the through-hole 312 may have, such as, but not limited to, a circular shape and corresponds to the securing portion 616 of the lamp supporter 610.

The lamps of the light source 400 are positioned on the reflecting member 300 and substantially parallel with one another. The lamps of the light source 400 may have, for example, but not limited to, a rod shape, a U shape, etc. The lamps of the light source 400 are spaced apart from one another by a selected distance so that the backlight assembly 600 may have uniform luminance of the light generated from the lamps of the light source 400. The number of the lamps of the light source 400 may be increased or decreased based on demand for higher or lower luminance of the backlight assembly 600.

Referring back to FIG. 6, the backlight assembly 600 may further include lamp holders 410 to have the lamps of the light source 400 securely held in the receiving container 200. The lamps of the light source 400 are inserted into and combined with the lamp holders 410. The lamp holders 410 are affixed to the receiving container 200. In this exemplary embodiment, two lamps of the light source 400 are inserted into and combined with each of the lamp holders 410, but not limited thereto.

The diffusion plate 500 is positioned on the lamps of the light source 400 to diffuse the light generated from the lamps of the light source 400 and thus may enhance uniform luminance of the light. The diffusion plate 500 is supported by the receiving container 200 and the side mold 620. In other words, end portions of the diffusion plate 500, which are substantially parallel with the longitudinal direction of the lamps of the light source 400, are combined with the sidewalls 220 of the receiving container 200. The side mold 620 corresponds to end portions of the lamps of the light source 400 to support the diffusion plate 500. The side mold 620 covers and holds the lamp holder 410. Further, the side mold 620 covers the end portions of the lamps of the light source 400 that emits less light than other portion, for example, a center portion of the lamps of the light source 400. As a result, luminance uniformity of the light may be implemented. The diffusion plate 500 includes a guide recess 510 to correspond to the side mold 620. End portions of the diffusion plate 500, which are substantially perpendicular to the longitudinal direction of the lamps of the light source 400, are combined with the side mold 620. The side mold 620 supports the diffusion plate 500 and includes a protrusion 622 to combine with the diffusion plate 500. The protrusion 622 is inserted into and combined with the guide recess 510 of the diffusion plate 500. In this exemplary embodiment, the protrusion 622 is formed around a center portion of the side mold 620. However, it should be understood that location of the protrusion 622 may vary in different embodiments of the present invention.

Referring to FIG. 7, the lamp supporter 610 of FIG. 6 is combined with the bottom plate 210 to hold the lamps of the light source 400. The lamp supporter 610 includes a lamp holding portion 612, a diffusion plate supporting part 614, and the securing portion 616. The lamp holding portion 612 has an open portion thereto so that the lamps of the light source 400 may be inserted thereto and combined therewith. The diffusion plate supporting part 614 is upwardly protruded higher than the lamp holding portion 612 toward the diffusion plate 500 to support the diffusion plate 500. In the exemplary embodiment, the diffusion plate supporting part 614 has a trapezoid shape, but not limited thereto. The securing portion 616 securely holds the lamp supporter 610 to the bottom plate 210. The securing portion 616 is securely combined with the bottom plate 210 through the through-hole 312 and the securing hole 212 in sequence. The lamp supporter 610 of FIG. 6 is securely combined with the receiving container 200 to prevent movement of the reflecting member 300 in the longitudinal direction of the lamps of the light source 400.

In this exemplary embodiment, the lamp supporter 610 includes two lamp holding portions 612, but not limited thereto. The two lamp holding portions 612 face each other with respect to the diffusion plate supporting part 614. Alternatively, if the lamp supporter 610 includes four lamp holding portions 612, two of the lamp holding portions 612 face another two lamp holding portions 612 with respect to the diffusion plate supporting part 614. In the exemplary embodiment, the lamp supporters 610 are arranged in a zigzag shape along the longitudinal direction of the lamps of the light source 400 to prevent generation of a dark line on the backlight assembly 600. Referring back to FIG. 6, the backlight assembly 600 further includes optical sheets 630, a middle mold 640, and an inverter 650. The optical sheets 630 are positioned on the diffusion plate 500. The middle mold 640 receives end portions of the diffusion plate 500 and the optical sheets 630 and is combined with the receiving container 200. The inverter 650 applies an electric power to the lamps of the light source 400.

The optical sheets 630 may enhance optical characteristics, such as luminance uniformity, of the light through the diffusion plate 500. The optical sheets 630 may include, such as, but not limited to, a brightness enhancement film (BEF), which increases luminance of the light with a top view of the backlight assembly 600, a diffusion sheet, which diffuses the light passing through the diffusion plate 500, etc.

The middle mold 640 receives the diffusion plate 500 and the optical sheets 630 and is combined with the receiving container 200. Alternatively, the middle mold 640 may consist of, for example, but not limited to, a plurality of parts and be formed by assembling these parts. The inverter 650 is positioned under the receiving container 200 and applies an electric power to the lamps of the light source 400. The inverter 650 boosts the electric power externally provided to a higher level voltage and applies the electric power to the lamps of the light source 400 through lamp wires 652 (only 4 shown in FIG. 6).

Figure 8:
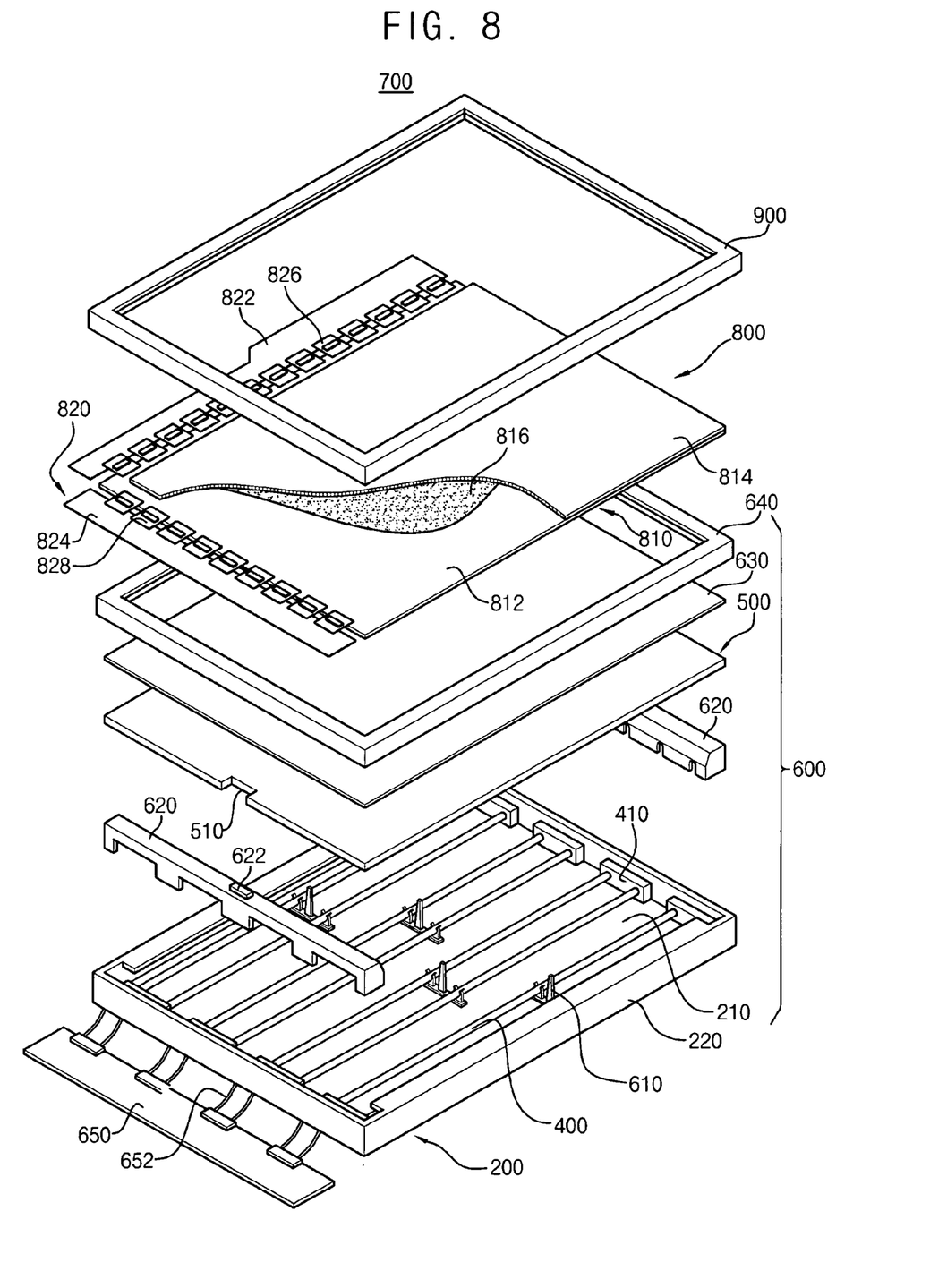
FIG. 8 is an exploded perspective view showing a liquid crystal display (LCD) device in accordance with another exemplary embodiment.
Figure 9:
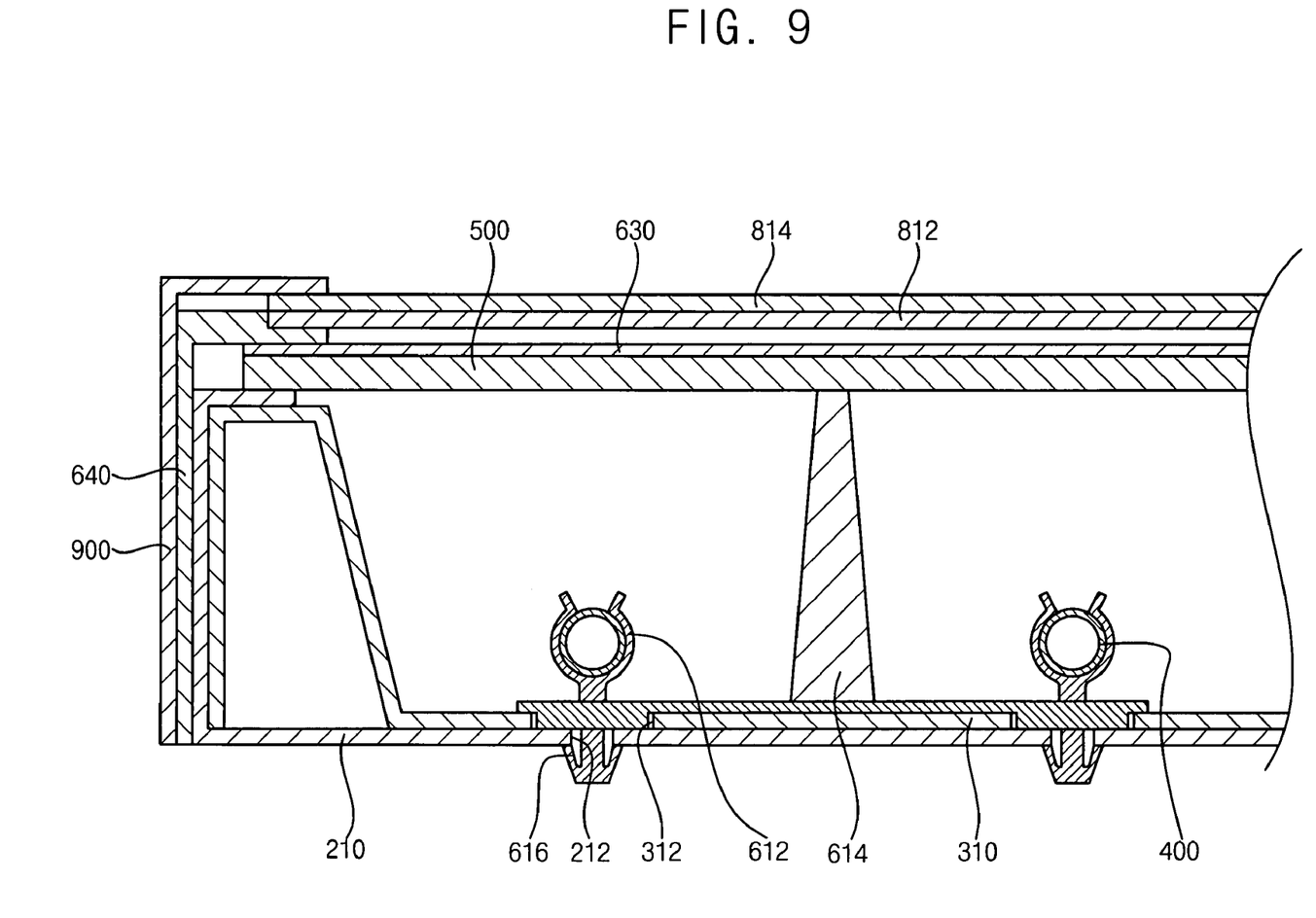
FIG. 9 is a side cross-sectional view showing the LCD device shown in FIG. 8.

FIG. 8 is an exploded perspective view showing a liquid crystal display (LCD) device 700 in accordance with another exemplary embodiment. FIG. 9 is a cross-sectional view showing the LCD device 700 shown in FIG. 8. The backlight assembly 600 of FIGS. 8 and 9 is substantially the same as that of FIGS. 1 to 7. Thus, the same reference numerals will be used to refer to the same or like parts as those described in FIGS. 1 to 7 and any further explanation will be omitted to avoid duplication.

Referring to FIGS. 8 and 9, the LCD device 700 includes a backlight assembly 600, a display unit 800, and a top chassis 900.

The display unit 800 includes an LCD panel 810 and a driving circuit part 820. The LCD panel 810 displays images using light generated from the backlight assembly 600. The driving circuit part 820 applies driving signals to the LCD panel 810.

The LCD panel 810 includes a thin film transistor (TFT) substrate 812, a color filter substrate 814 corresponding to the TFT substrate 812, and a liquid crystal layer 816 interposed between the TFT substrate 812 and the color filter substrate 814.

The TFT substrate 812 includes a glass substrate and a plurality of TFTs (not shown) arranged in a matrix shape. A source electrode of each of the TFTs is electrically connected to one of data lines (not shown) formed on the glass substrate, and a gate electrode of each of the TFTs is electrically connected to one of gate lines (not shown) formed on the glass substrate. A drain electrode of each of the TFTs is electrically connected to a pixel electrode (not shown) formed on the glass substrate.

The color filter substrate 814 includes red (R), green (G) and blue (B) color filters (not shown) that are thin films. In addition, the color filter substrate 814 further includes a common electrode (not shown) on the RGB color filters. The common electrode is a transparent electrode.

When electric power is applied to the gate electrodes of the TFTs, the TFTs are turned on and an electric field is generated between the pixel electrode and the common electrode. Arrangement of liquid crystal in the liquid crystal layer 816 varies in response to the electric field applied thereto the LCD device 700 may display images in response to variation of the arrangement of the liquid crystal.

The driving circuit part 820 includes a data printed circuit board (PCB) 822, a gate PCB 824, a data flexible circuit film 826, and a gate flexible film 828. The data PCB 822 applies data driving signals to the LCD panel 810. The gate PCB 824 applies gate driving signals to the LCD panel 810. The data flexible circuit film 826 electrically connects the data PCB 822 to the LCD panel 810. The gate flexible circuit film 828 electrically connects the gate PCB 824 to the LCD panel 810. Each of the data and gate flexible circuit films 826 and 828 may be, such as, but not limited to, a tape carrier package (TCP), a chip on film (COF), etc.

The data flexible circuit film 826 is backwardly bent so that the data PCB 822 is positioned on a side surface or a rear surface of the receiving container 200. The gate flexible circuit film 828 is backwardly bent so that the gate PCB 824 is positioned on the side surface or the rear surface of the receiving container 200. Alternatively, an auxiliary signal line (not shown) may be formed on the LCD panel 810 and the gate flexible circuit film 828 and thus the gate PCB 824 may be omitted.

The top chassis 900 surrounds end portions of the LCD panel 810 and is combined with the receiving container 200 so that the LCD panel 810 is combined with the backlight assembly 600. The top chassis 900 protects the LCD panel 810 from external impact and prevents a drifting of the LCD panel 810. The top chassis 870 may have, such as, but not limited to, a strong metal, etc.

According to the present invention, a double-sided tape, which combines the reflecting member to the receiving container, may be omitted and thus a manufacturing process for fabricating the reflecting member may be simplified. Additionally, deformation of the reflecting member during the manufacturing process may be decreased and thus the reflecting member may have a flat surface.

Furthermore, a size of the sidewalls of the receiving container may be decreased and thus the total size of the backlight assembly may be decreased.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A backlight assembly comprising:
   a receiving container including a bottom plate and a sidewall upwardly protruded from end portions of the bottom plate and having at least one recess;
   a reflecting member including a reflecting part and a fixing part extended from end portions of the reflecting part to be inserted into and snapped within the at least one recess;
   a light source disposed above the reflecting member to generate light; and
   a diffusion plate disposed above the light source to diffuse the light.

2. The backlight assembly of claim 1, wherein the sidewall comprises:
   a side portion extended from the at least one end portion of the bottom plate in a direction substantially perpendicular to the bottom plate; and
   a support portion inwardly extended from at least one end portion of the side portion to form the recess.

3. The backlight assembly of claim 2, wherein the sidewall comprises first, second, third, and fourth sidewall pairs, and the two sidewall parts of the first, second, third, and fourth sidewall parts make contact with the support portion.

4. The backlight assembly of claim 2, wherein the fixing part comprises:
   a first fixing portion upwardly extended from the at least one end portion of the reflecting part;
   a second fixing portion outwardly extended from the first fixing portion to make contact with the support portion; and
   a third fixing portion downwardly extended from the second fixing portion to make contact with the sidewall.

5. The backlight assembly of claim 4, wherein the first fixing portion forms an obtuse angle with respect to the reflecting part.

6. The backlight assembly of claim 4, wherein the reflecting member comprises a first groove famed at a contact point between the reflecting part and the first fixing portion.

7. The backlight assembly of claim 6, wherein the first groove has an open circular shape.

8. The backlight assembly of claim 4, wherein the reflecting member comprises a second groove formed at a contact point between the first and second fixing portions.

9. The backlight assembly of claim 8, wherein the second groove has an open circular shape.

10. The backlight assembly of claim 4, wherein the reflecting member comprises a third groove formed at a contact point between the second and third fixing portions.

11. The backlight assembly of claim 10, wherein the third groove has an open circular shape.

12. The backlight assembly of claim 2, wherein the diffusion plate is supported by the support portion.

13. A backlight assembly comprising:
   a receiving container including a bottom plate with at least one securing-hole and a sidewall upwardly protruded from end portions of the bottom plate and having at least one recess;
   a reflecting member including a reflecting part with at least one through-hole and a fixing part extended from end portions of the reflecting part to be inserted into and snapped within the at least one recess;
   a light source disposed above the reflecting member and having at least one lamp to generate light;
   at learnt one light supporter having the at least one lamp securely combined with the bottom plate; and
   a diffusion plate disposed above the light source to diffuse the light.

14. The backlight assembly of claim 13, wherein the sidewall comprises:
   a side portion extended from the at least one end portion of the bottom plate in a direction substantially perpendicular to the bottom plate; and
   a support portion inwardly extended from at least one end portion of the side portion to form the recess,
   wherein the sidewall comprises first, second, third, and fourth sidewall parts make contact with the support portion.

15. The backlight assembly of claim 13, wherein the fixing part comprises:
   a first fixing portion upwardly extended from the at least one end portion of the reflecting part;
   a second fixing portion outwardly extended from the first fixing portion to make contact with the support portion; and
   a third fixing portion downwardly extended from the second fixing portion to make contact with the sidewall,
   wherein the fixing portion forms an obtuse angle with respect to the reflecting part.

16. The backlight assembly of claim 15, wherein the reflecting member comprises a first groove formed at a contact point between the reflecting part and the first fixing portion.

17. The backlight assembly of claim 16, wherein the first groove has an open circular shape.

18. The backlight assembly of claim 15, wherein the reflecting member comprises a second groove formed at a contact point between the first and second fixing portions.

19. The backlight assembly of claim 18, wherein the second groove has an open circular shape.

20. The backlight assembly of claim 15, wherein the reflecting member comprises a third groove formed at a contact paint between the second and third fixing portions.

21. The backlight assembly of claim 20, wherein the third groove has an open circular shape.

22. The backlight assembly of claim 15, wherein the at least one lamp supporter comprises:
   a lamp holding portion operable to receive the lamp and having an open circular shape;
   a diffusion plate supporting part operable to support the diffusion plate; and
   a securing portion operable to being securely combined with the bottom plate through the through-hole and the securing hole.

23. The backlight assembly of claim 22, further comprising at least one lamp holder making contact with the sidewall, wherein the at least one lamp holder having the at least one lamp securely inserted into and snapped within itself.

24. The backlight assembly of claim 23, further comprising a side mold corresponding to an end portion of the at least one lamp and supporting the diffusion plate.

25. The backlight assembly of claim 24, wherein the side mold comprises a protrusion to guide the diffusion plate and the diffusion plate comprises a guide recess corresponding to the protrusion.

26. The backlight assembly of claim 25, further comprising:
   an optical sheet disposed on the diffusion plate;
   a middle mold operable to receive end portions of the diffusion plate and the optical sheet; and
   an inverter operable to apply an electric power to the light source to generate the light.

27. A liquid crystal display device comprising:
   a backlight assembly including:
      a receiving container including a bottom plate with at least one securing-hole and a sidewall upwardly protruded from end portions of the bottom plate and having at least one recess;
      a reflecting member including a reflecting part with at least one through-hole and a fixing part extended from end portions of the reflecting part to be inserted into and snapped within the at least one recess; and
      a light source disposed above the reflecting member and having at least one lamp to generate a light;
      at least one light supporter having the at least one lamp securely combined with bottom plate; and
      a diffusion plate disposed above the light source to diffuse the light;
   a liquid crystal display panel operable to display images in response to the light from the backlight assembly.

28. The liquid crystal display device of claim 27, wherein the sidewall comprises:
   a side portion extended from the at least one end portion of the bottom plate in a direction substantially perpendicular to the bottom plate; and
   a support portion inwardly extended from at least one end portion of the side portion to form the recess.

29. The liquid crystal display device of claim 28, wherein the sidewall comprises first, second, third, and fourth sidewall parts, and the two sidewall parts of the first, second, third, and fourth parts make contact with the support portion.

30. The liquid crystal display device of claim 28, wherein the fixing part comprises:

a first fixing portion upwardly extended from the at least one end portion of the reflecting part;

a second fixing portion outwardly extended from the first fixing portion to make contact with the support portion; and a third fixing portion downwardly extended from the second fixing portion to make contact with the sidewall.

31. The liquid crystal display device of claim 30, wherein the reflecting member comprises a first groove formed at a contact point between the reflecting part and the first fixing portion.

32. The liquid crystal display device of claim 31, wherein the first groove has an open circular shape.

33. The liquid crystal display device of claim 30, wherein the reflecting member comprises a second groove formed at a contact point between the first and second fixing portions.

34. The backlight assembly of claim 33, wherein the second groove has an open circular shape.

35. The backlight assembly of claim 30, wherein the reflecting member comprises a third groove formed at a contact point between the second and third fixing portions.

36. The backlight assembly of claim 34, wherein the third groove has an open circular shape.

37. The liquid crystal display device of claim 30, wherein the at least one lamp supporter comprises:

a lamp holding portion operable to receive the lamp and having an open circular shape;

a diffusion plate supporting part operable to support the diffusion plate; and a securing portion operable to being securely combined with the bottom plate through the through-hole and the securing hole.

38. The liquid crystal display device of claim 37, further comprising at least one lamp holder making contact with the sidewall, wherein the at least one lamp holder has the at least one lamp securely inserted into and snapped within itself.

39. The liquid crystal display device of claim 38, further comprising a side mold corresponding to an end portion of the at least one lamp and supporting the diffusion plate, wherein the side mold comprises a protrusion to guide the diffusion plate and the diffusion plate comprises a guide recess corresponding to the protrusion.

40. The backlight assembly of claim 39, further comprising:

an optical sheet disposed above the diffusion plate;

a middle mold operable to receive end portions of the diffusion plate and the optical sheet; and an inverter operable to apply an electric power to the light source to generate the light.

* * * * *